Nov. 20, 1962 T. D. SHARPLES 3,064,454
OVERLOAD RELEASE COUPLING
Filed June 6, 1961
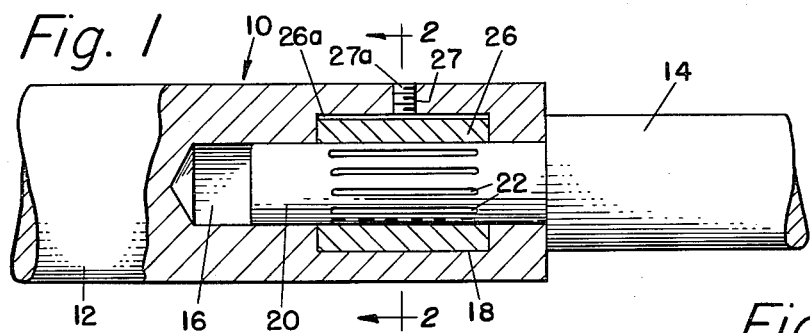
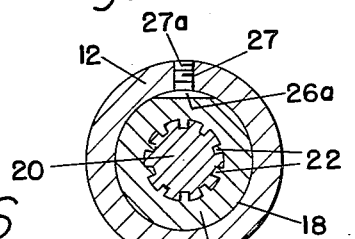
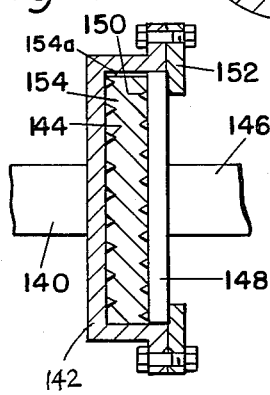
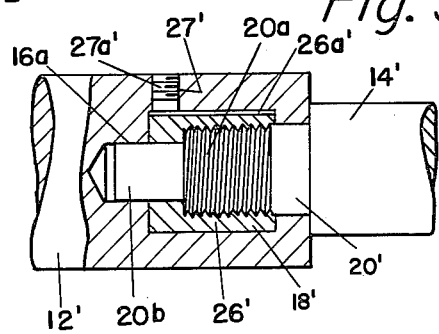
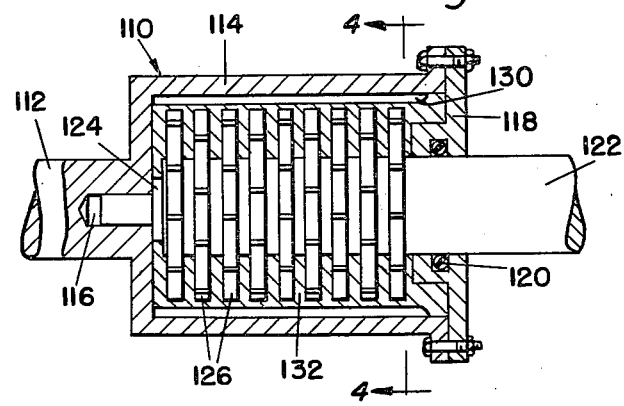
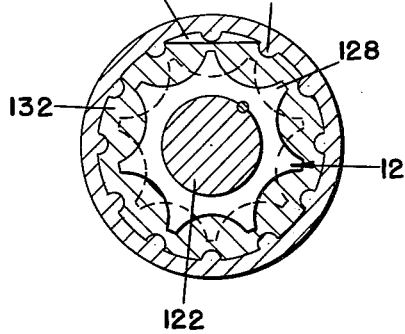
INVENTOR.
THOMAS D. SHARPLES
BY Dallett Hoopes
ATTORNEY 3,064,454
OVERLOAD RELEASE COUPLING
Thomas D. Sharples, Lansdale, Pa., assignor to The Sharples Corporation, a corporation of Delaware
Filed June 6, 1961, Ser. No. 115,147
4 Claims. (Cl. 64—28)

This invention relates to an overload release coupling. More specifically, this invention relates to a rotary coupling adapted to release its load at excessive torque and to automatically restore itself to its engaged condition after rotation has been discontinued.

Still more specifically this invention relates to an overload release coupling comprising connecting means of a fracturable and fusible bonding material, which at excessive load will fracture to disengage the coupling and will later fuse and solidify to reengage.

In the prior art it is well known to connect axially aligned rotating elements by a shear element usually in the form of a pin extending in a radial direction through aligned radial openings in adjacent parts of the rotating elements. At excessive torque, or overload, opposite rotary forces will be sufficient to shear the shear element in its zone between the rotating elements, halting the transmission of torque to the driven element and thereby protecting the power means of the driving element.

While inexpensive, such shear elements or pins of the prior art present the disadvantage that their repeated removal and replacement often results in damage to the driving and driven elements. There is also the problem that the pins or elements may inadvertently be replaced with improper material not sufficiently sensitive to the shearing force and which will not yield at overload.

Additionally, the shear element replacement operation itself is often time-consuming since the elements are frequently not readily accessible. Partial disassembly of the machine may be necessary. It can readily be appreciated that consumption of such time, particularly in a commercial operation, is a great drawback of the prior devices.

With the foregoing in mind, it is the object of my invention to provide an overload release coupling of the shear type which does not require the removal and replacement of the shear element.

It is a further object of my invention to provide an overload release coupling which automatically resets itself after stoppage of the driving element.

These and other objects will be evident from the drawings and the following description which is to be limited only by the appended claims.

FIGURE 1 is a side view partially is section of a coupling embodying my invention;

FIGURE 2 is a slightly enlarged sectional view taken on the line 2—2 of FIGURE 1;

FIGURE 3 is a side view partly in section of a modified form of coupling embodying the invention;

FIGURE 4 is a sectional view taken on the line 4—4 of FIGURE 3;

FIGURE 5 is a sectional view of a further embodiment; and

FIGURE 6 is a sectional view of a still further embodiment.

Briefly, my invention is an overload release coupling comprising a driving element and a driven element, a fracturable and fusible material bonding the two together, and means for confining the bonding material to the area of the bond.

Referring more specifically to the drawings, a coupling embodying my invention is generally designated 10 in FIGURE 1. It comprises a driving element 12 and a driven element 14, the former slightly larger in diameter than the latter. In the end face of the driving element is an axially disposed cylindrical bore 16 having an annular enlargement 18 or cavity spaced from the face. The driven element or shaft 14 is formed with a reduced cylindrical stub 20 on its end of diameter slightly smaller than that of the bore.

FIGURE 1 discloses that the stub portion of the driven element is received in journal fit into the bore of the driving element. The driving element engages the driven element in journal fit on both sides of the cavity 18 to establish a self-aligning relationship.

As shown, the portion of the stub 20 in the area of the annular enlargement has about its periphery spaced grooves 22 extending in a direction axial of the stub. Alternatively the surface may be knurled or serrated.

In the annular enlargement is disposed the connecting means which comprises a fracturable and fusible material 26 bonded to the surfaces of the annular enlargement and the stub. In practice this material may be Wood's metal, Rose's alloy, lead-tin solder, Babbitt type metal, sealing wax, investment casting wax, mixtures of metal powders and meltable solids, low melting glass, etc. The filling of the cavity by bond material 26 may be accomplished when the bond material is in fused condition. As the material cools and solidifies it usually contracts, leaving an air space shown illustratively at 26a in the cavity. The stub 20, however, is completely covered with the bond material; that is, the air space 26a does not extend down to adjacent the stub to impair the engagement of the bond material with the stub. Obviously, space 26a will provide for expansion of the material on subsequent fusing.

In operation, the occurrence of an excessive load will cause the bond material to yield under shear, breaking the connection between the driven and driving elements. Fracture will occur adjacent the stub 20 where the shear forces are greatest. Rotation thereafter causes friction of the stationary element 14 and the rotating element 12 in the areas of journal fit on either side of the cavity. This friction, especially with high speed rotation of element 12, produces sufficient heat to melt the fusible metal. This melt will be confined in the annular enlargement 18 by the snug fit of the stub 20 in the bore 16 adjacent the end face of the driving elements. After the driving element is shut down, the molten metal flows around the stub. Subsequently, the heat will dissipate through the elements and the fusible material will set, bonding itself once more to the elements and again becoming a driving connection ready for operation to be resumed.

Although it is not necessary, as an additional precaution, before resuming operation after overload release, heat may be applied directly adjacent to the end of the driving element to assure uniform melting and rebonding of the metal to the parts. It is also envisioned that such subsequent heat may be provided by a built-in heating element of manual or automatic operation.

Alternatively, instead of shutting down the driving element, a positive clutch or equivalent device disposed between the driven element and the load can be disengaged to permit the driven element to "free wheel" with the driving element. The solidification of the bond material about stub 20 will take place in a centrifugal field. In this organization the grooves 22 should be cut deeply in the shaft to afford the bond material opportunity to contract outward as it solidifies and still maintain good contact with the stub 20. To give increased expansion space, a central recess in the stub may communicate with the grooves.

A variety of methods may be used to fill the cavity 18 with bond material. These will be obvious to a mechanic skilled in the art. One such method may involve the case of a threaded radial fill opening 27 directed outward from the cavity and plugged by a threaded plug 27a having slotted outer end to receive a screw driver. Fused bond material may be introduced through the opening by an appropriate spout, the radial disposition of the opening 27 causing overflow of bond when the level of the bond in the cavity reaches the level of the outer end of the opening. By this procedure the amount of bond in the cavity and hence the shear point of the coupling can be controlled. Illustratively, if the axis of the elements 12 and 14 are horizontal and the opening 27 is disposed horizontal, the cavity will only be half full of bond when the bond overflows. If the opening is disposed 45° above the horizontal, as another illustration, the bond level will substantially fill the cavity before overflow and the yield point of the coupling will be higher than in the first illustration.

Alternatively the stub 20 can be removed from the bore 16, and the cavity 18 can be filled through the bore.

A modified form of coupling embodying the invention is disclosed in FIGURES 3 and 4 and generally designated 110. It comprises the driving element 112 terminating in a cup-shaped member 114 having an axial bore 116 in its inside end wall. The open end of the cup-shaped member is closed by an annular cover plate 118 bolted or otherwise fastened thereover. As shown, the cover plate is thickened about its central opening and is formed on its inner periphery with an annular groove receiving an O-ring 120 of heat resistant resilient material such as neoprene.

The driven element 122 fits snugly through the opening in the annular cover plate 118 and terminates in a reduced portion received in journal fit into bore 116. Intermediate the main body of the shaft and the reduced portion 124, the radial face of which shoulders against the end wall of the cup-shaped member 114 to bear end thrust.

The portion of the shaft within the cup-shaped member is provided with a plurality of axially spaced star-shaped plates 126, each plate having radially outward directed fins 128 extending from a central hub. To enhance engagement with the bond material the star-shaped plates are staggered (FIGURE 4) so that fins on adjacent plates are not aligned. The plates are keyed to the shaft 122, or alternatively the shaft may be square shaped and be received into correspondingly shaped openings in the plates 126 to prevent relative rotation.

As shown, the inside peripheral wall of the cup-shaped member carries a plurality of spaced inwardly directed ridges 130 extending in a direction parallel to the axis of rotation.

As with the earlier embodiment, fracturable and fusible material 132 in the cup-shaped member bonds the driving and driven elements together. The connection is enhanced by the ridges 130 and fins 128. Air pocket 132a provides for expansion. Operation of the modified form of the invention is similar to the earlier described embodiment.

A further embodiment is shown in FIGURE 5 wherein the stub 20' of the driven element is threaded in its portion 20a disposed in the cavity 18'. The distal end 20b of the stub is reduced in diameter to avoid interference with the bond material 26' in assembly and is received within the inner portion 16a of the axial bore in journal fit. In FIGURE 5 parts corresponding to similar parts of the FIGURE 1 embodiment are designated by the primed form of the same reference numeral.

The embodiment of FIGURE 5 offers the advantage that its torque limit can be preset accurately by selecting the suitable thread to be formed on the stub. The pitch and the depth of thread both will determine the torque limit. Illustratively, a thread of low pitch will cause the bond material adjacent the thread to shear more readily than a thread of higher pitch. Similarly a thread of shallow depth will cause material adjacent the thread to shear away more readily than a deeper thread. The chosen thread can be easily formed on the stub by conventional methods. Obviously, the direction of thread should be selected so that the driving element in rotating tends to tighten rather than loosen the threaded engagement.

Another embodiment is disclosed in FIGURE 6 wherein the driving element 140 carries a shallow cup-shaped element 142 having an end wall with a roughened face 144. The driven element 146 terminates in a disc 148 also presenting a circular roughened face 150. The disc is journalled in the cup-shaped element with the two faces opposing and adjacent each other. An annular plate 152 closes the end of the cup-shaped element about the driven shaft. The space between the discs is filled with bond material 154 similar to that of the other embodiments. Air space 154a provides for expansion of the bond material. In this face-to-face coupling, operation is similar to that of the first embodiments.

It should be noted that in all embodiments greater control of the yield point between the bond material and the driven element can be attained if the surface of the driven element is such that the bond material does not wet it. This may be achieved by disposing on the driven element a coating—soot, any of certain oxides, etc.—which will not permit wetting by the particular bond material. If the bond material does not so wet the driven element then changes in the configuration—threaded, knurled, grooved, for instance—of the surface of the stub will have more marked effect on the yield point than where there is actual wetting or fusing of the bond material to the shaft.

It will, of course, be understood that the coupling disclosed above may be used in any situation where rotary force is transmitted. Its axis may be horizontal, vertical or otherwise, and the mechanic skilled in the art will be able to apply it to a wide variety of use.

As used throughout the specification and claims, the terms "driving" and "driven" imply a tendency toward relative rotation of the two elements. Both of the elements may actually be stationary, with one tending to exert a turning force on the other and the other resisting the turning force.

I have developed a simple, inexpensive coupling which automatically yields at a predetermined overload to release the load and which, after rotation of the driving element is discontinued, automatically resets itself, making possible continued operation. There is no necessity for replacement of parts; its operation is foolproof. My development fills a long-felt need in the overload coupling art.

While my invention has been shown in but limited number of forms, it is not so limited, but is susceptible of many variations as will be evident to persons skilled in the art. As a mere example, I contemplate that the principle of the invention, without losing all of its effectiveness, can be used in the transmission of forces other than rotary ones. Reciprocating motion may be transmitted by an apparatus embodying the invention, for instance. I intend therefore to be limited only according to the scope of the appended claims.

I claim:

1. An overload release coupling comprising a driving element and a driven element, one of said elements having an axially disposed opening in one end, the other of said elements having spaced from said end a cavity larger in diameter than said opening, said other element extending snugly through said opening at least into the cavity, said other element being threaded in a zone within the cavity, a fracturable and fusible material disposed in said cavity and normally bonding together said driving and driven elements.

2. An overload release coupling comprising a driving element and a driven element, one of said elements having an axial opening in one end and having spaced from said end and communicating with the opening an axial cavity larger in radial dimension than said opening and a second opening communicating with the cavity on the opposite side of the cavity from said first opening, the other element extending through the first opening and into the second opening and having peripheral portions snugly engaging said one element in both the areas of the first and second openings to provide means for assuring alignment of the driving and driven elements as well as a source of friction upon relative movement between the two elements, and a fracturable and fusible material disposed in said cavity and normally bonding together said driving and driven elements.

3. An overload release coupling as described in claim 2 wherein said other element is threaded in a zone within the cavity.

4. An overload release coupling comprising a driving element and a driven element, one of said elements having an axial opening in one end and having spaced from said end and communicating with the opening an axial cavity and a second opening communicating with the cavity on the opposite side of the cavity from said first opening, the other element extending through the first opening and into the second opening and having peripheral portions snugly engaging said one element in both the areas of the first and second openings to provide means for assuring alignment of the driving and driven elements as well as a source of friction upon relative movement between the two elements, and a fracturable and fusible material disposed in said cavity and normally bonding together said driving and driven elements.

References Cited in the file of this patent

UNITED STATES PATENTS 2,539,534   Eckhardt _____ Jan. 30, 1951

FOREIGN PATENTS 510,000   Germany _____ Oct. 15, 1930